(12) United States Patent
Ku et al.

(10) Patent No.: US 9,577,466 B2
(45) Date of Patent: Feb. 21, 2017

(54) WIRELESS CHARGING SYSTEM AND METHOD FOR CONTROLLING THE SAME

(71) Applicants: Hyundai Motor Company, Seoul (KR); Konkuk University Industrial Cooperation Corporation, Seoul (KR)

(72) Inventors: Hyun Chul Ku, Seoul (KR); Jae Yong Seong, Anyang (KR); Ka Hyun Kim, Gwanmun-Ro (KR); Jung Min No, Gyeonggi-Do (KR); Bae Seok Park, Gyeonggi-Do (KR); Jong Gyun Lim, Seoul (KR); Won Shil Kang, Seoul (KR)

(73) Assignees: Hyundai Motor Company, Seoul (KR); Konkuk University Industrial Cooperation Corp., Seoul (KR)

( * ) Notice: Subject to any disclaimer, the term of this patent is extended or adjusted under 35 U.S.C. 154(b) by 183 days.

(21) Appl. No.: 14/562,956

(22) Filed: Dec. 8, 2014

(65) Prior Publication Data

US 2016/0064988 A1 Mar. 3, 2016

(30) Foreign Application Priority Data

Aug. 27, 2014 (KR) ........................ 10-2014-0112093

(51) Int. Cl.
*H02J 7/00* (2006.01)
*H02J 7/02* (2016.01)
*B60L 11/18* (2006.01)

(52) U.S. Cl.
CPC .............. *H02J 7/025* (2013.01); *B60L 11/182* (2013.01); *B60L 11/1831* (2013.01); *H02J 7/007* (2013.01); *B60L 2230/14* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/14* (2013.01)

(58) Field of Classification Search
CPC ........ H02J 7/025; H02J 7/007; B60L 11/1831; B60L 11/182; B60L 2230/14; Y02T 90/14; Y02T 10/7088; Y02T 10/7005; Y02T 90/125; Y02T 90/121; Y02T 90/122
See application file for complete search history.

(56) References Cited

U.S. PATENT DOCUMENTS

| 2012/0212178 A1* | 8/2012 | Kim .................... H02J 7/025 320/108 |
| 2014/0191714 A1* | 7/2014 | Chiu .................... H02J 7/025 320/108 |
| 2015/0318740 A1* | 11/2015 | Fratti .................... H02J 17/00 320/108 |

FOREIGN PATENT DOCUMENTS

| JP | H08-265992 A | 10/1996 |
| JP | 2011-254633 A | 12/2011 |
| JP | 2013-172507 A | 9/2013 |
| JP | 2014-090528 A | 5/2014 |
| KR | 10-2013-0099699 A | 9/2013 |
| KR | 10-2013-0106706 A | 9/2013 |

(Continued)

*Primary Examiner* — Nha Nguyen
(74) *Attorney, Agent, or Firm* — Mintz Levin Cohn Ferris Glovsky and Popeo, P.C.; Peter F. Corless

(57) ABSTRACT

A wireless charging system for a vehicle may include: a power transmitter having a plurality of transmitting coils; and a controller configured to measure a current and a voltage of each of the plurality of transmitting coils and to apply charging power only to a subset of the plurality of transmitting coils based on a magnitude of the measured current and voltage of each of the plurality of transmitting coils.

7 Claims, 8 Drawing Sheets

(56) References Cited

FOREIGN PATENT DOCUMENTS

KR  10-2014-0025529 A  3/2014

\* cited by examiner

WIRELESS CHARGING SYSTEM AND METHOD FOR CONTROLLING THE SAME

CROSS REFERENCE TO RELATED APPLICATION

The present application claims priority to and the benefit of Korean Patent Application No. 10-2014-0112093, filed Aug. 27, 2014, the entire contents of which are incorporated herein for all purposes by reference.

BACKGROUND

1. Technical Field

The present disclosure relates to a wireless charging system and a method for controlling the same, and more particularly, to a wireless charging system in which a transmitter configured of a plurality of transmitting coils uses a transmitting coil having the highest charging efficiency to be able to wirelessly transmit power and a method for controlling the same.

2. Description of the Related Art

Recently, technologies associated with plug-in hybrid vehicles and electric vehicles have been rapidly developed. As is known in the art, some or all of the driving force of such vehicles derives from electric energy. In order to charge the electric energy, various techniques have been developed, such as inserting a wired plug connected to a charger into an outlet, or wirelessly charging electric energy. With respect to the latter, there are currently various techniques which allow a vehicle to recognize a nearby wireless charger as the vehicle approaches, where the recognized wireless charger may be arranged at a charging pad in connection with magnetic resonance-based wireless charging, as an example.

To increase wireless charging efficiency, it is necessary to accurately arrange the positions of receiving coils, e.g., in a receiving pad, which are mounted in a vehicle and the positions of transmitting coils, e.g., in a transmitting pad, which are included in a charger. To this point, FIG. 1 is a graph illustrating power transmission efficiency depending on a distance between central points of the transmitting coils and the receiving coils. Referring to FIG. 1, it may be appreciated that as an interval 'a' between the central points of the transmitting coils Tx_coils and the receiving coils Rx_coils increases, the power transmission efficiency is accordingly reduced.

SUMMARY

An object of the present disclosure is to provide a wireless charging system and a method for controlling the same capable of transmitting power by applying charging power only to transmitting coils in which central points of the transmitting coils and receiving coils coincide with each other in a vertical direction to increase power transmission efficiency.

According to embodiments of the present disclosure, there is provided a wireless charging system, including: a power transmitter having a plurality of transmitting coils; and a controller configured to measure a current and a voltage of each of the plurality of transmitting coils and to apply charging power only to a subset of the plurality of transmitting coils based on a magnitude of current and voltage of each of the plurality of transmitting coils.

The power transmitter may include a plurality of connection parts each provided between each of the plurality of transmitting coils and a plurality of power supply units which are configured to supply charging power to each of the plurality of transmitting coils.

The controller may be further configured to apply the charging power only to a transmitting coil of the plurality of transmitting coils having a largest magnitude of voltage among each of the plurality of transmitting coils.

The controller may be further configured to apply the charging power only to a transmitting coil of the plurality of transmitting coils having a smallest magnitude of current among each of the plurality of transmitting coils.

The controller may be further configured to apply the charging power only to one or more transmitting coil of the plurality of transmitting coils having a magnitude of voltage which is larger than a magnitude of a preset threshold voltage.

The controller may be further configured to apply the charging power only to one or more transmitting coil of the plurality of transmitting coils having a magnitude of current which is smaller than a magnitude of a preset threshold current.

The controller may be further configured to detect positions of a plurality of receiving coils relative to positions of the plurality of transmitting coils, the plurality of receiving coils receiving power from the plurality of transmitting coils, based on a change in voltage or current of the plurality of transmitting coils.

The controller may be further configured to apply the charging power only to the subset of the plurality of transmitting coils based on the detected relative positions of the plurality of receiving coils and the plurality of transmitting coils.

The controller may be further configured to transmit a sensing signal having a smaller magnitude than that of a charging signal to the plurality of transmitting coils, in order to measure the voltage and the current of the plurality of transmitting coils.

The controller may be further configured to facilitate a connection between a connection part of the plurality of connection parts, which is connected to the transmitting coil of the plurality of transmitting coils having a largest magnitude of voltage among each of the plurality of transmitting coils, and a power supply unit of the plurality of power supply units.

The controller may be further configured to facilitate a connection between the connection part of the plurality of connection parts, which is connected to a transmitting coil of the plurality of transmitting coils having a smallest magnitude of current among each of the plurality of transmitting coils, and a power supply unit of the plurality of power supply units.

The controller may be further configured to apply the charging power only to the transmitting coil of the plurality of transmitting coils having a largest variation of voltage or current among each of the plurality of transmitting coils.

The controller may be further configured to control a connection part of the plurality of connection parts to form a closed circuit of at least one transmitting coil of the plurality of transmitting coils to which the charging power is not applied.

Furthermore, according embodiments of the present disclosure, there is provided a method for controlling a wireless charging system, including: measuring, by a controller, a voltage and a current of a plurality of transmitting coils; and applying, by the controller, charging power only to a subset of the plurality of transmitting coils based on a magnitude of the measured current and voltage of each of the plurality of transmitting coils.

The applying of the charging power may include: facilitating, by the controller, a connection between a connection part of a plurality of connection parts, which is connected to a transmitting coil of the plurality of transmitting coils, and a power supply unit of a plurality of power supply units, wherein each of the plurality of connection parts is provided between each of the plurality of transmitting coils, and the plurality of power supply units are configured to supply charging power to the plurality of transmitting coils.

In the applying of the charging power, the charging power may be applied only to the transmitting coil of the plurality of transmitting coils having a largest magnitude of voltage among each of the plurality of transmitting coils.

In the applying of the charging power, the charging power may be applied only to the transmitting coil of the plurality of transmitting coils having a smallest magnitude of current among each of plurality of the transmitting coils.

The method may further include: detecting, by the controller, positions of the subset of the plurality of transmitting coils relative to positions of one or more receiving coils receiving the power from the subset of the plurality of transmitting coils.

In the measuring of the current and the voltage, the current and the voltage may be measured based on a sensing signal having a smaller magnitude than that of a charging signal, the sensing signal being transmitted to the plurality of transmitting coils.

Furthermore, according embodiments of the present disclosure, there is provided a non-transitory computer readable medium containing program instructions for controlling a wireless charging system, including: program instructions that measure a voltage and a current of a plurality of transmitting coils; and program instructions that apply charging power only to a subset of the plurality of transmitting coils based on a magnitude of the measured current and voltage of each of the plurality of transmitting coils.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION OF THE EMBODIMENTS

Figure 1:
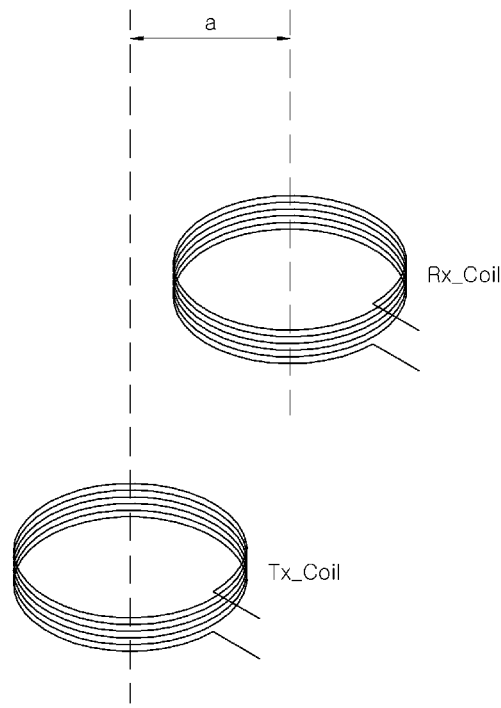
FIG. 1 is a graph illustrating power transmission efficiency depending on a distance between central points of transmitting coils and receiving coils.
Figure 1:
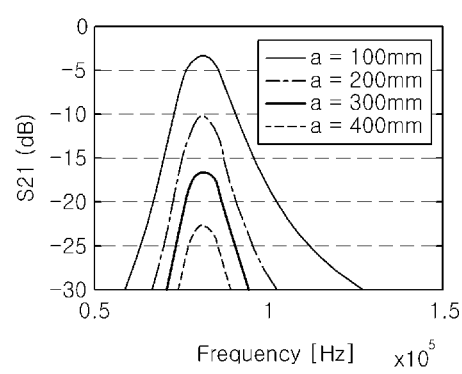

Specific structural and functional descriptions disclosed in the present specification are illustrated merely to describe embodiments of the present disclosure. Therefore, the embodiments of the present disclosure may be practiced in various forms and are not to be construed as being limited only to the embodiments disclosed herein. The embodiments of the present disclosure may be modified and have various forms. Therefore, specific embodiments are illustrated in the accompanying drawings and will be described in detail in the present specification. However, it is to be understood that the present disclosure is not limited to the disclosed embodiments, but includes all modifications, equivalents, and substitutions included in the spirit and the scope of the present disclosure.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" or the like, should be similarly interpreted.

Terms used in the present specification are used only in order to describe embodiments rather than limiting the present disclosure. Singular forms are intended to include plural forms unless the context clearly indicates otherwise. It will be further understood that the terms "comprises", "have" or the like used in this specification, specify the presence of stated features, numerals, steps, operations, components, parts, or a combination thereof, but do not preclude the presence or addition of one or more other features, numerals, steps, operations, components, parts, or a combination thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for implementing a wireless charging system for a vehicle.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. Like reference numerals proposed in each drawing denote like components.

Figure 2:
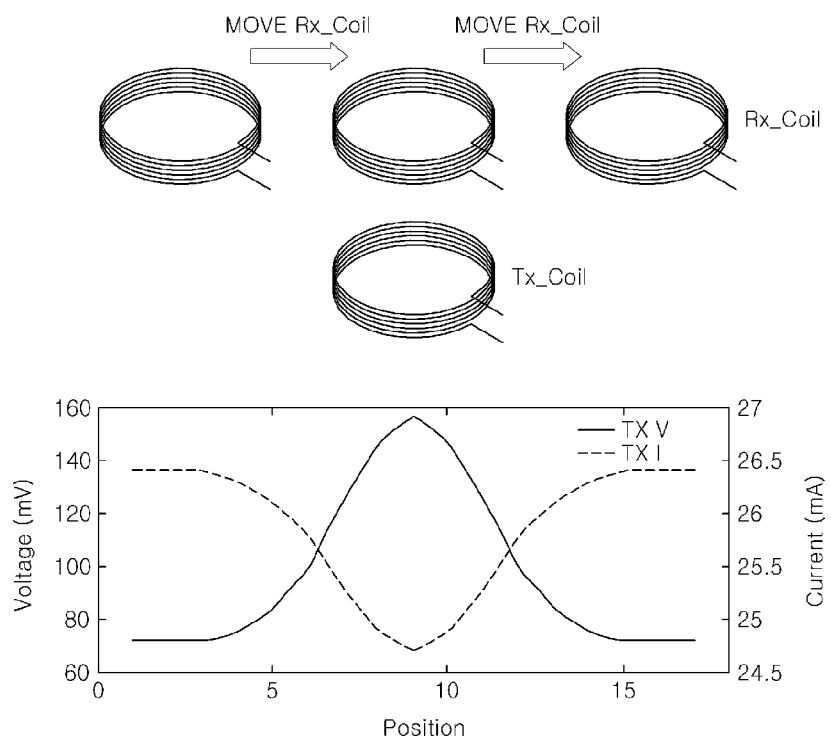
FIG. 2 is a graph illustrating a change in a magnitude of voltage and current which are applied to the transmitting coils depending on an arrangement between the receiving coils and the transmitting coils.

FIG. 2 is a graph illustrating a change in a magnitude of voltage and current which are applied to transmitting coils depending on an arrangement between receiving coils and the transmitting coils. Referring to FIG. 2, when a central point of a transmitting coil Tx_coil and a receiving coil Rx_coil is present on a straight line in a vertical direction as a position of the receiving coil is changed, it may be appreciated that a magnitude of voltage applied to the transmitting coils is largest and a magnitude of current flowing in the transmitting coil is smallest. That is, when the central point of the transmitting coil and the receiving coil is present on a straight line in a vertical direction, a distance between the transmitting coil and the receiving coil is closest, the magnitude of voltage applied to the transmitting coil is largest, and the power transmission efficiency to the receiving coil is highest.

Figure 3A:
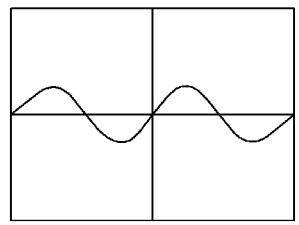
FIGS. 3A to 3D are diagrams illustrating the change in the magnitude of voltage and current which are applied to the transmitting coils depending on the positions of the transmitting coils relative to positions of the receiving coils.
Figure 3A:
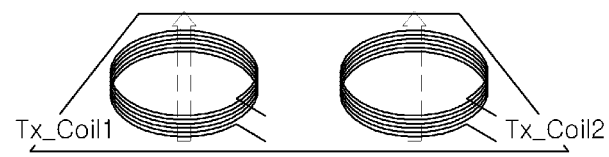
Figure 3B:
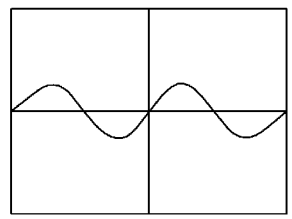
Figure 3B:
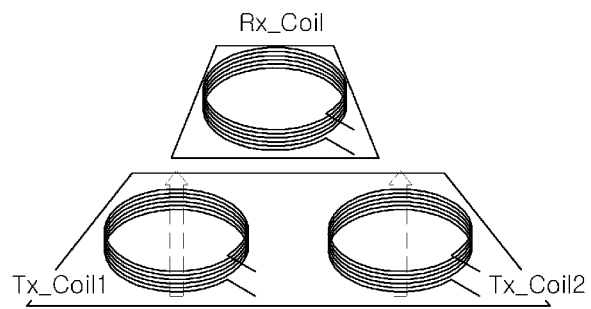
Figure 3C:
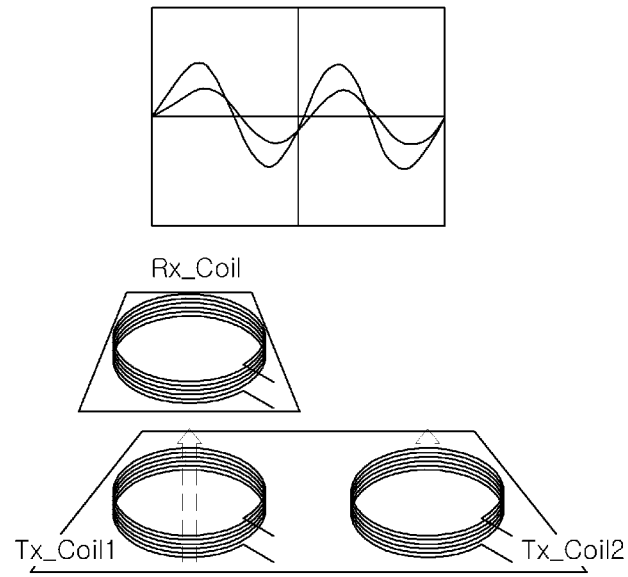
Figure 3D:
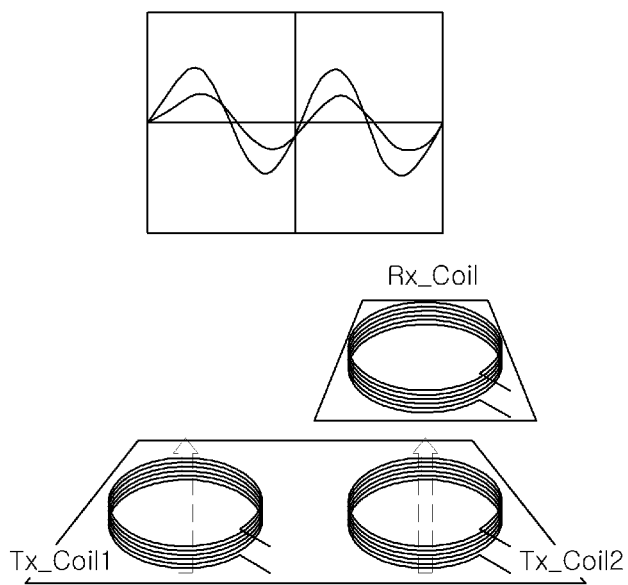

FIGS. 3A to 3D are diagrams illustrating the change in the magnitude of voltage and current which are applied to the transmitting coils depending on the positions of the transmitting coils relative to positions of the receiving coils. FIG. 3A illustrates voltage curves of each of the transmitting coils when the receiving coils are not present around the transmitting coils, in which it may be appreciated that the voltage curves coincide with each other. FIG. 3B illustrates the voltage curves of each of the transmitting coils when the receiving coil is positioned at a center between the transmitting coils, for example, in the case in which two transmitting coils are present, in which it may be appreciated that the voltage curves also coincide with each other. FIG. 3C illustrates the voltage curves of the two transmitting coils, for example, in the case in which a left coil of the two transmitting coils and the receiving coil are arranged. It may be appreciated that a magnitude of voltage of the left transmitting coil is larger. Similarly, FIG. 3D illustrates the voltage curves of the two transmitting coils, for example, in the case in which a right coil of the two transmitting coils and the receiving coil are arranged. It may be appreciated that the magnitude of voltage of the right transmitting coil is larger.

Figure 4:
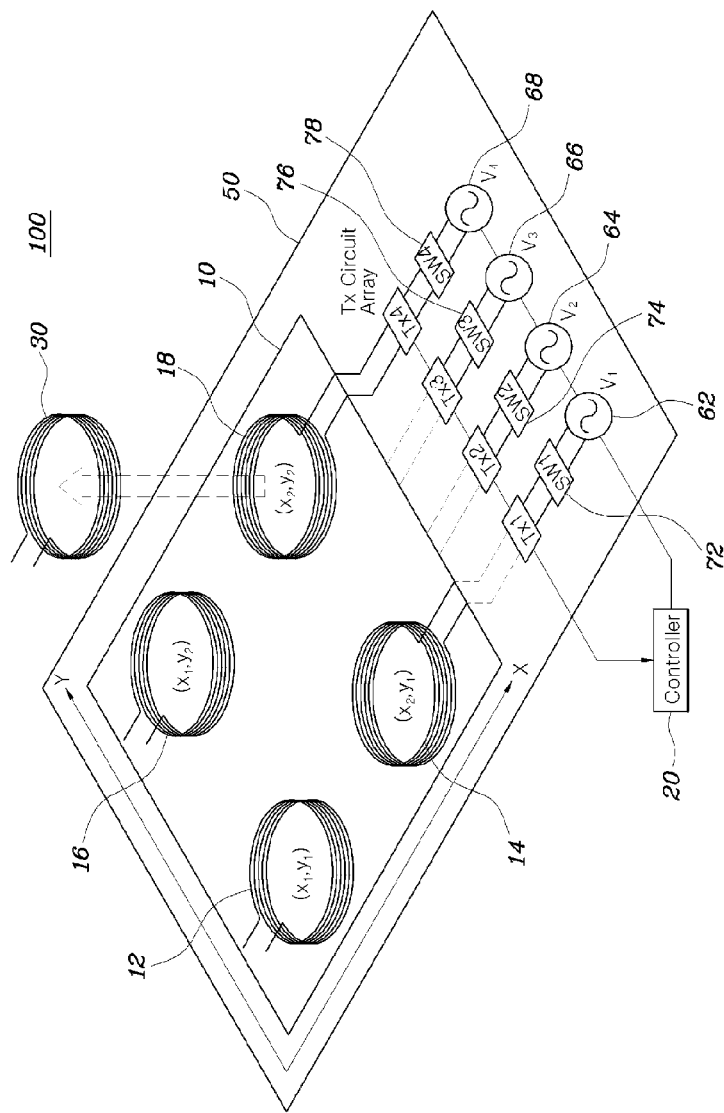
FIGS. 4 and 5 are diagrams schematically illustrating a wireless charging system according to embodiments of the present disclosure.
Figure 5:
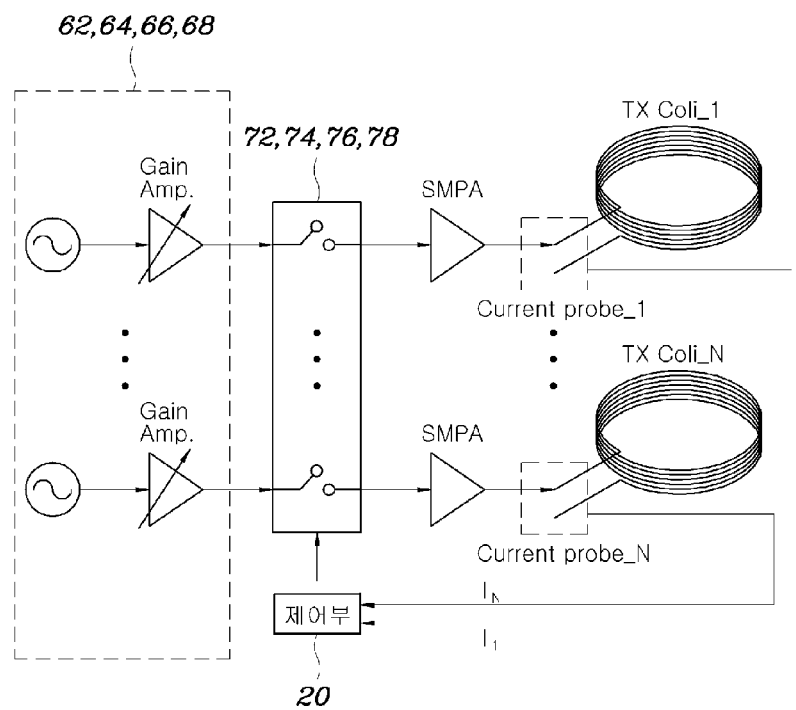

FIGS. 4 and 5 are diagrams schematically illustrating a wireless charging system according to embodiments of the present disclosure. A wireless charging system 100 according to embodiments of the present disclosure may include a power transmitter 50 including a transmitting pad 10 having a plurality of transmitting coils 12, 14, 16, and 18 and a controller 20 measuring current and voltage of each of the plurality of transmitting coils 12, 14, 16, and 18 and applying charging power only to the transmitting coil 18 among the plurality of transmitting coils 12, 14, 16, and 18 based on the measured magnitude of current and voltage of each of the transmitting coils 12, 14, 16, and 18. For the purposes of the above-described scenario, the transmitting coil 18 may represent the "subset" of the plurality of transmitting coils 12, 14, 16, and 18.

The power transmitter 50 may include transmitting coil controllers Tx1 to Tx4 which sense the magnitude of voltage and current of each of the transmitting coils 12, 14, 16, and 18 and configure a transmitting circuit array transmitting the sensed magnitude of voltage and current to the controller 20. The transmitting coil controllers Tx1 to Tx4 may have preset coordinate values of each of the transmitting coils 12, 14, 16, and 18 and transfer the preset coordinate values to the controller 20. The controller 20 may detect a relative position of the receiving coil 30 based on the received coordinate values of each of the transmitting coils 12, 14, 16, and 18 and the magnitude of voltage and current applied to each of the transmitting coils 12, 14, 16, and 18. Further, the transmitting coil controllers Tx1 to Tx4 may control a turn on/off operation of connection parts 72, 74, 76, and 78 based on an instruction of the controller 20. Further, the transmitting coil controllers Tx1 to Tx4 receive the instruction of the controller 20 to be able to change a phase and a magnitude of the voltage or the current applied to each of the transmitting coils.

Further, the power transmitter 50 may include the connection parts 72, 74, 76, and 78 between a plurality of power supply units 62, 64, 66, and 68 which supply charging power to each of the plurality of transmitting coils 12, 14, 16, and 18 and each of the transmitting coils 12, 14, 16, and 18. The connection parts 72, 74, 76, and 78 may be configured of a switching device and may be turned on/off based on the instruction of the controller 20.

In an example scenario, the controller 20 may apply the charging power only to the transmitting coil having the largest magnitude of voltage among the measured magnitude of voltage of each of the transmitting coils. For example, as illustrated in FIG. 4, when the position of the receiving coil 30 is arranged with the transmitting coil 18 among all the transmitting coils 12, 14, 16, and 18 (e.g., when the central point of the receiving coils 30 and the central point of the transmitting coil 18 are present on the straight line), the magnitude of voltage of the corresponding transmitting coil 18 among all the transmitting coils 12, 14, 16, and 18 is largest. In this case, the controller 20 may turn on only the connection part 78 connected to the corresponding transmitting coil 18. Therefore, the charging power from the power supply unit 68 corresponding to the corresponding transmitting coil 18 may be applied to the corresponding transmitting coil 18.

Alternatively, for example, when the receiving coil 30 is positioned on the transmitting coils 16 and 18 among all the transmitting coils 12, 14, 16, and 18, the magnitude of voltage applied to the transmitting coils 16 and 18 among all the transmitting coils 12, 14, 16, and 18 may be larger than a magnitude of preset reference voltage. That is, the controller 20 may apply the charging power only to the transmitting coils 16 and 18 having a magnitude of voltage which is larger than a magnitude of a preset threshold voltage among the measured magnitudes of voltage of each of the transmitting coils.

To the contrary, in another example scenario, the controller 20 may apply the charging power only to the transmitting coil having the smallest magnitude of current among the measured magnitude of current of each of the transmitting coils. For example, as illustrated in FIG. 4, when the position of the receiving coil 30 is arranged with the transmitting coil 18 among all the transmitting coils 12, 14, 16, and 18 (e.g., when the central point of the receiving coils 30 and the central point of the transmitting coil 18 are present on the straight line), the magnitude of current of the corresponding transmitting coil 18 among all the transmitting coils 12, 14, 16, and 18 is smallest (refer to FIG. 2). In this case, the controller 20 may turn on only the connection part 78 connected to the corresponding transmitting coil 18. Therefore, the charging power from the power supply unit 68 corresponding to the corresponding transmitting coil 18 may be applied to the corresponding transmitting coil 18.

Alternatively, for example, when the receiving coil 30 is positioned on the transmitting coils 16 and 18 among all the transmitting coils 12, 14, 16, and 18, the magnitude of current applied to the transmitting coils 16 and 18 among all the transmitting coils 12, 14, 16, and 18 may be smaller than a magnitude of preset reference current. That is, the controller 20 may apply the charging power only to the transmitting coils 16 and 18 having a magnitude of current which is equal or smaller than a magnitude of a preset threshold current among the measured magnitudes of current of each of the transmitting coils.

The preset threshold voltage and current may be the preset threshold voltage and current to increase the power transmission efficiency. That is, for example, setting the preset magnitude of voltage in the graph illustrated in FIG. 2 to be 100 V in advance means the increase in power transmission efficiency only when the voltage applied to the transmitting coil is at least 100 V since the voltage applied to the transmitting coil is changed depending on the interval between the central points of the transmitting coils and the receiving coils. For example, in the foregoing example, when the voltage applied to the first transmitting coil 12 is less than 100 V, the required power transmission efficiency may not be achieved by the power transmission by the first transmitting coil 12. Therefore, when the voltage applied to the first transmitting coil 12 is less than 100 V, the charging power 62 may not be applied by the first transmitting coil 12.

Further, the control unit 20 may store the position of the transmitting coil having the largest magnitude of voltage or the smallest magnitude of current relative to the position of the receiving coil 30 receiving power from the transmitting coil 18. The relative position may be set as coordinates in x and y directions.

Alternatively, the controller 20 may measure a change in voltage or current of the plurality of transmitting coils 12, 14, 16, and 18 to detect the position of the receiving coil receiving the power from the transmitting coil relative to positions of each of the transmitting coils 12, 14, 16, and 18. Next, the controller 20 may control the turn on/off operation of the connection parts 72, 74, 76, and 78 based on the position of the detected receiving coil 30 relative to positions of the transmitting coils 12, 14, 16, and 18 so as to apply the charging power only to the transmitting coil 18 among the transmitting coils.

Further, the controller 20 may transmit the sensing signal having a magnitude smaller than a charging power signal supplied when the charging power is charged in the plurality of transmitting coils 12, 14, 16, and 18 in order to measure the voltage and the current applied to the plurality of transmitting coils 12, 14, 16, and 18 based on the sensing signal. That is, to determine the transmitting coil 18 to which the charging power is supplied, the controller 20 may supply a micro sensing current smaller than the sensing current at the time of supplying the charging power to each of the plurality of transmitting coils 12, 14, 16, and 18 in order to measure the current and the voltage applied to the transmitting coils 12, 14, 16, and 18.

Further, the controller 20 may detect variations of the voltage and the current applied to each of the transmitting coils when the plurality of transmitting coils 12, 14, 16, and 18 are not connected to each of the charging power supplies and the plurality of transmitting coils 12, 14, 16, and 18 are connected to each of the charging power supplies by the connection part to control the connection parts 72, 74, 76, and 78 so as to apply the charging power only to the transmitting coil having the largest detected variation of voltage and current.

The wireless charging system of FIG. 5 includes the power supply units 62, 64, 66, and 68, the controller 20, and the power transmitter 50. Referring to FIGS. 4 and 5, the power supply units 62, 64, 66, and 68 may each include power supplies X1 to Xn and an amplifier. The charging power may be amplified by the amplifier and supplied to each of the transmitting coils Tx Coil_1 to Tx Coil_N through the connection part. As an example illustrated in FIG. 5, the magnitude of current of the transmitting coil is measured through any one of the current probes Current Probe_1 to Current Probe_N and the magnitude of current of the transmitting coil is supplied to the controller 20. The controller 20 may compare the magnitudes of current applied to each of the transmitting coils 12, 14, 16, and 18 to search for the transmitting coil 18 having a minimum magnitude of current to control the turn on/off operation of the connection part 78 connected to the transmitting coil 18 having the smallest magnitude of current.

Figure 6:
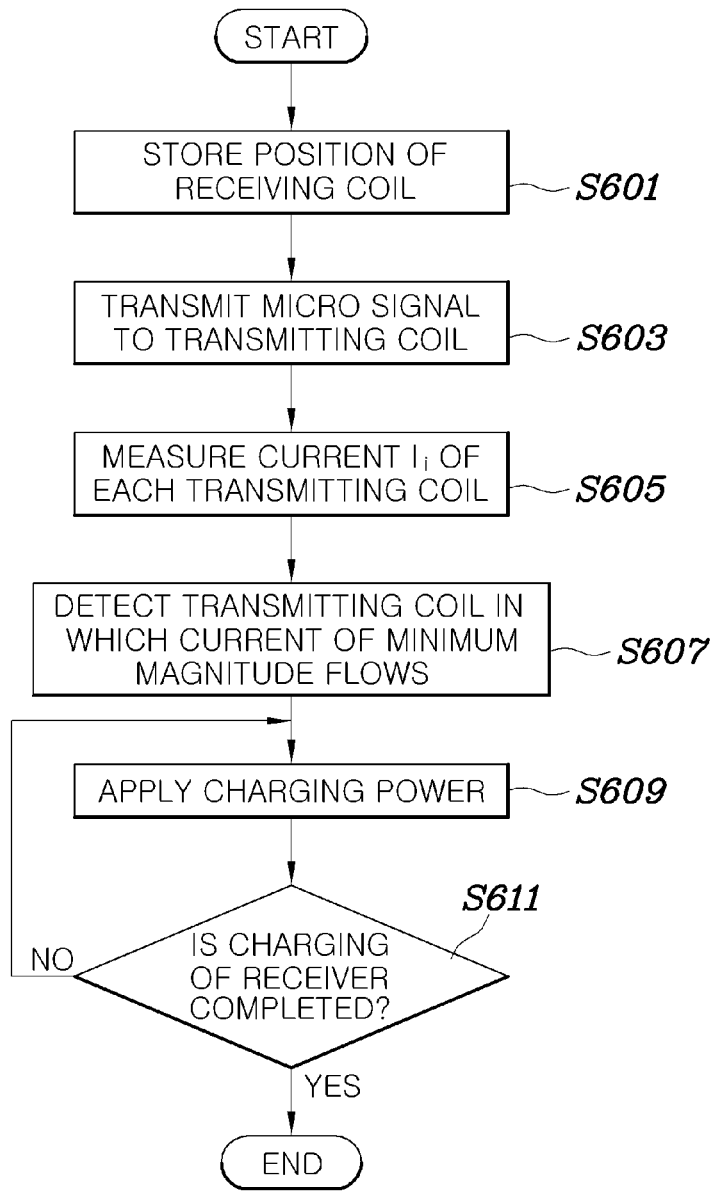
FIG. 6 is a flow chart schematically illustrating a method for controlling a wireless charging system according to embodiments of the present disclosure.

FIG. 6 is a flow chart schematically illustrating a method for controlling a wireless charging system according to embodiments of the present disclosure. Referring to FIGS. 4 and 8, first, the controller 20 stores a current position of a vehicle, e.g., a position of the receiving coil 30 which is mounted in the vehicle (S601). After the position of the receiving coil 30 which is mounted in the vehicle is stored, the controller 20 transmits a micro signal to the transmitting coils 12, 14, 16, and 18 (S603). The controller 20 measures the magnitude of current flowing in each of the transmitting coils 12, 14, 16, and 18 depending on the transmitted micro signal using the current probe (S605). The micro signal is the sensing current which has a magnitude smaller than a current supplied from the charging power supply at the time of charging. The transmitting coil 18 in which the current having the smallest magnitude among the measured current magnitudes flows is detected (S607). The controller 20 may facilitate a connection between the charging power supply and the detected transmitting coil 18 (S609) and may determine whether the power transmission to the receiving coil 30 is completed, in order to determine whether the charging is continuously performed based on a determination result (S611).

Figure 7A:
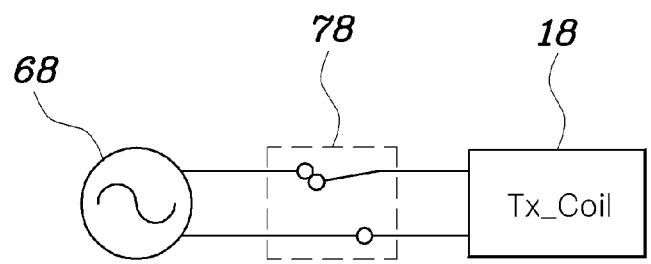
FIGS. 7A and 7B are diagrams illustrating a connection state of a connection part in the wireless charging system according to embodiments of the present disclosure.
Figure 7B:
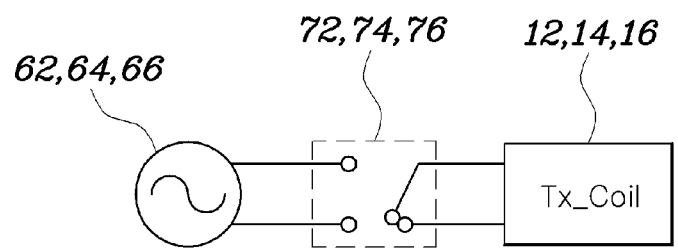

FIGS. 7A and 7B are diagrams illustrating a connection state of a connection part in the wireless charging system according to embodiments of the present disclosure. FIG. 7A illustrates the connection part 78 between the transmitting coil 18 to which the charging power is applied and the power supply 68 corresponding to the transmitting coil 18, and FIG. 7B illustrates the connection parts 72, 74, and 76 between the transmitting coils 12, 14, and 16 to which the charging power is not applied and the power supplies 62, 64, and 66 corresponding to the transmitting coils 12, 14, and 16. As illustrated in FIG. 7A, the connection part 78 may connect the power supply 68 to the transmitting coil 18 in order to apply the charging power to the transmitting coil 18, and as illustrated in FIG. 7B, the connection part 78 may connect both terminals of the transmitting coils 12, 14, and 16 to form a closed circuit within the transmitting coils, such that the remaining transmitting coils 12, 14, and 16 may be used as a repeater coil transmitting power. In this case, a power transmission range may be expanded.

According to the wireless charging system and the method for controlling the same in accordance with embodiments of the present disclosure, it is possible to accurately measure the position of the receiving coils in the wireless charging system of which the position may be relatively changed and apply the charging power only to a subset (i.e., one or more) of the plurality of transmitting coils based on the measured positions, thereby maximizing power transmission efficiency and saving costs. Further, it is possible to implement high-power transmission efficiency within a wider range by converting the transmitting coils to which the charging power is not applied among the plurality of transmitting coils into closed circuit form.

Although the present disclosure has been described with reference to embodiments shown in the accompanying drawings, they are only examples. It will be appreciated by those skilled in the art that various modifications and equivalent other embodiments are possible from the present disclosure. Accordingly, an actual technical protection scope of the present disclosure is to be defined by the following claims.

What is claimed is:

1. A wireless charging system which transfers wireless power to a receiving coil mounted on a vehicle through a magnetic coupling, the wireless charging system comprising:
    a plurality of transmitting coils placed at predetermined different positions on a power transmitter;
    a plurality of power supply units supplying voltage and current to the plurality of transmitting coils;
    a plurality of switches connecting each of the plurality of transmitting coils to each of the plurality of power supply units, respectively;
    a plurality of transmitting coil controllers connecting each of the plurality of transmitting coils to each of the plurality of switches, respectively, wherein each of the plurality of transmitting coil controllers store a preset coordinate value of one of the plurality of transmitting coils, sense a magnitude of voltage or current of one of the plurality of transmitting coils, and control a turn on/off operation of one of the plurality of switches, respectively; and
    a controller connecting each of the plurality of transmitting coils to each of the plurality of power supply units, receiving the stored coordinate value and information about the magnitude of voltage or current, and applying charging power only to a subset of the plurality of transmitting coils based on the stored coordinate value and the information about the magnitude of voltage or current.

2. The wireless charging system of claim 1, wherein the controller applies the charging power only to one or more transmitting coil of the plurality of transmitting coils having a magnitude of current which is smaller than a magnitude of a preset threshold current or a magnitude of voltage which is larger than a magnitude of a preset threshold voltage.

3. The wireless charging system of claim 1, wherein the controller transmits a sensing signal to the plurality of transmitting coils, the sensing signal having a magnitude smaller than a charging power signal supplied when a charging power is charged in at least one of the plurality of transmitting coils, detects a relative position of the receiving coil to the plurality of transmitting coils based on a change in voltage or current of the plurality of transmitting coils, and applies the charging power only to the subset of the plurality of transmitting coils based on the detected relative position of the receiving coil.

4. The wireless charging system of claim 1, wherein the controller controls the plurality of switches to form closed circuits of each of the plurality of transmitting coils to which the charging power is not applied.

5. A method for controlling a wireless charging system which transfers wireless power to a receiving coil mounted on a vehicle through a magnetic coupling, the method comprising:
    applying, by a controller, a sensing signal to a plurality of transmitting coils placed at predetermined different positions on a power transmitter, the sensing signal having a magnitude smaller than a charging power signal supplied when a charging power is charged in at least one of the plurality of transmitting coils;
    receiving, by the controller, preset coordinate values of the plurality of transmitting coils and information about a voltage and a current of the plurality of transmitting coils from a plurality of transmitting coil controllers, wherein each of the plurality of transmitting coil controllers connect each of the plurality of transmitting coils to each of a plurality of switches, store a preset coordinate value of one of the plurality of transmitting coils, sense a magnitude of current or voltage of one of the plurality of transmitting coils, and control a turn on/off operation of one of the plurality of switches, respectively; and
    applying, by the controller, charging power only to a subset of the plurality of transmitting coils based on the stored coordinate value and the magnitude of current or voltage of each of the plurality of transmitting coils.

6. The method of claim 5, wherein in the applying of the charging power, the subset of the plurality of transmitting coils to which the charging power is applied is selected based on the coordinate value and a change in current or voltage of the plurality of transmitting coils.

7. A non-transitory computer readable medium containing program instructions for controlling a wireless charging system which transfers wireless power to a receiving coil mounted on a vehicle through a magnetic coupling, the computer readable medium comprising:
    program instructions that apply a sensing signal to a plurality of transmitting coils placed at predetermined different positions on a power transmitter, the sensing signal having a magnitude smaller than a charging power signal supplied when a charging power is charged in at least one of the plurality of transmitting coils;
    program instructions that receive preset coordinate values of the plurality of transmitting coils and information about a voltage and a current of the plurality of transmitting coils from a plurality of transmitting coil controllers, wherein each of the plurality of transmitting coil controllers connect each of the plurality of transmitting coils to each of a plurality of switches, store a preset coordinate value of one of the plurality of transmitting coils, sense a magnitude of current or voltage of one of the plurality of transmitting coils, and control a turn on/off operation of one of the plurality of switches, respectively; and program instructions that apply charging power only to a subset of the plurality of transmitting coils based on the stored coordinate value and the magnitude of current or voltage of each of the plurality of transmitting coils.

* * * * *